United States Patent
Kousselson et al.

(10) Patent No.: US 12,304,509 B2
(45) Date of Patent: May 20, 2025

(54) METHOD FOR CONTROLLING A VEHICLE

(71) Applicant: Robert Bosch GmbH, Stuttgart (DE)

(72) Inventors: Boris Kousselson, Stuttgart (DE); Julia Heroldt, Stuttgart (DE); Frederik Morlok, Wildberg Gueltlingen (DE); Panagiotis Kosioris, Urbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 428 days.

(21) Appl. No.: 17/837,824

(22) Filed: Jun. 10, 2022

(65) Prior Publication Data
US 2022/0402514 A1 Dec. 22, 2022

(30) Foreign Application Priority Data
Jun. 14, 2021 (DE) .................. 10 2021 206 042.0

(51) Int. Cl.
*B60W 50/029* (2012.01)
*B60W 30/09* (2012.01)
*B60W 30/12* (2020.01)
*B60W 50/00* (2006.01)
(Continued)

(52) U.S. Cl.
CPC .......... *B60W 50/029* (2013.01); *B60W 30/09* (2013.01); *B60W 30/12* (2013.01); *B60W 50/0205* (2013.01); *B60W 60/0011* (2020.02); *B60W 60/0015* (2020.02); *B60W 2050/0005* (2013.01); *B60W 2050/021* (2013.01); *B60W 2050/0292* (2013.01); *B60W 2420/403* (2013.01); *B60W 2420/408* (2024.01)

(58) Field of Classification Search
CPC ........... B60W 50/029; B60W 60/0015; B60W 60/0011; B60W 30/09; B60W 30/12; B60W 50/0205; B60W 2420/408; B60W 2050/0005; B60W 2050/021; B60W 2050/0292; B60W 2420/403
See application file for complete search history.

(56) References Cited

U.S. PATENT DOCUMENTS 9,829,884 B1 * 11/2017 Trigui .................. G05D 1/0246
10,061,313 B2 * 8/2018 Letwin ................ G05D 1/0088
10,114,374 B2 * 10/2018 Tao .......................... G07C 5/00
(Continued)

FOREIGN PATENT DOCUMENTS

DE 102017109175 A1 * 10/2018

*Primary Examiner* — Christian Chace
*Assistant Examiner* — Richard Edwin Geist
(74) *Attorney, Agent, or Firm* — NORTON ROSE FULBRIGHT US LLP

(57) ABSTRACT

A method for controlling a vehicle controllable in a highly/fully automated manner. The method includes: ascertaining a malfunction of a vehicle control unit of the vehicle, the vehicle control unit being designed for a highly automated and/or fully automated control of the vehicle; switching from the vehicle control unit to an emergency control unit, the emergency control unit being based on a driver assistance system and designed for maximally a conditionally automatic control of the vehicle, and the emergency control unit being configured to effectuate a control of the vehicle in the event of a malfunction of the vehicle control unit; executing the emergency control of the vehicle; and controlling the vehicle with the aid of the emergency control unit based on surroundings sensor data of the vehicle.

13 Claims, 4 Drawing Sheets

(51) Int. Cl.
  *B60W 50/02*   (2012.01)
  *B60W 60/00*   (2020.01)

(56) References Cited

U.S. PATENT DOCUMENTS

| | | | |
|---|---|---|---|
| 10,661,788 B2 * | 5/2020 | Grewe | B60W 30/12 |
| 11,345,359 B2 * | 5/2022 | Zhu | G05D 1/0077 |
| 11,964,675 B2 * | 4/2024 | Hiemer | B60W 30/09 |
| 11,981,349 B2 * | 5/2024 | Nister | B60W 60/001 |
| 2021/0197805 A1 * | 7/2021 | Robbel | G06V 10/764 |
| 2022/0135075 A1 * | 5/2022 | Ng | G06F 9/505 |
| | | | 701/301 |
| 2022/0363276 A1 * | 11/2022 | Wulf | B60W 30/18163 |

* cited by examiner

METHOD FOR CONTROLLING A VEHICLE

FIELD

The present invention relates to a method for controlling a vehicle.

BACKGROUND INFORMATION

For semi-automated and fully automated driving systems of vehicles, the need for a redundancy of the vehicle control unit of the vehicle exists so that the control of the vehicle may be effectuated by carrying out an emergency control in the event of a failure of the vehicle control unit or in the event of an occurrence of a safety-relevant error.

A frequently employed strategy is the integration of redundant structures into the control path of a vehicle. For this purpose, homogeneous and heterogeneous redundancies may be implemented. In the case of homogeneous redundancy, an active path and a fallback path are comparably or identically designed in terms of functionality and characteristic. In the case of heterogeneous redundancy, the active path and the fallback path differ in terms of characteristic and/or functionality. Both approaches, however, are problematic with respect to a guaranteeable diversity of the control components used of the two paths.

SUMMARY

It is an object of the present invention to provide an improved method for controlling a vehicle.

This object may be achieved by a method for controlling a vehicle in accordance with the present invention. Advantageous embodiments of the present invention are disclosed herein.

According to one aspect of the present invention, a method for controlling a vehicle which is controllable in a highly/fully automated manner is provided. In accordance with an example embodiment of the present invention, the method includes:
- ascertaining a malfunction of a vehicle control unit of the vehicle, the vehicle control unit being designed for a highly automated and/or fully automated control of the vehicle;
- switching from the vehicle control unit to an emergency control unit, the emergency control unit being based on a driver assistance system and designed for maximally a conditionally automatic control of the vehicle, and the emergency control unit being configured to effectuate a control of the vehicle in the event of a malfunction of the vehicle control unit;
- carrying out the emergency control of the vehicle; and
- controlling the vehicle with the aid of the emergency control unit based on surroundings sensor data of the vehicle.

In this way, a technical advantage may be achieved that an improved method for controlling the vehicle, in particular, a vehicle which is controllable in a highly or fully automated manner, may be provided. In particular, the method according to the present invention makes it possible to provide an emergency control when a malfunction of the vehicle control unit occurs. According to the present invention, the vehicle control unit is designed as a highly automated and/or fully automated control unit. The emergency control, in contrast, is based on a driver assistance system and is maximally designed for a conditionally automatic control of the vehicle. In the entire application, the automation levels of the standard SAE J3016 are used, which are described below.

Due to the improved method, a more efficient control of a fully automated vehicle may be achieved.

The emergency control unit is furthermore reduced in terms of complexity relative to the vehicle control unit in that the emergency control unit, compared to the vehicle control unit, is only able to carry out a reduced number of control actions, which in turn are implemented in a comparatively technically easy manner: Due to the reduced complexity, a simplification of the emergency control unit compared to the vehicle control unit can be achieved. As a result of the design of the emergency control unit being based on a driver assistance system, it may be achieved that systematic errors within the vehicle control unit are not transferred or propagated to the emergency control unit. In the process, the driver assistance system is developed completely independently of the vehicle control unit and, compared to the vehicle control unit, includes substantially different components, which may encompass both software components and hardware components. In this way, failure of both the vehicle control unit and of the emergency control unit due to systematic errors occurring in both may be avoided.

Furthermore, by using a driver assistance system as the emergency control unit for the vehicle control, an advantage may be achieved that driver assistance systems, due to their prior proven use in road traffic, have a high reliability and safety. The emergency control unit thus provides a reliable redundancy path for the vehicle control of the vehicle, thereby enabling a safe control of a vehicle which is controllable in a highly automated or fully automated manner.

The main idea of the present invention is to provide a method for controlling a vehicle, using an emergency control unit, which is limited to a deliberately reduced degree of automation of the control and to a minimum number of driving functions which are essentially required for a safe control of the vehicle. In this way, the complexity of the emergency control unit may be substantially reduced, by which the emergency control unit provides a cost-effective approach and additionally is less prone to errors. Additionally, due to the reduced complexity, an ability to check the functional capability as well as the diversity and redundancy of the emergency control unit may be increased compared to the vehicle control unit.

A malfunction of the vehicle control unit within the meaning of the present description exists, for example, due to erroneous control signals of the vehicle control unit or due to an absence of corresponding control signals of the vehicle control unit.

Within the meaning of the application, the vehicle control unit relates at least to the main path of a control path of a vehicle which is controllable in a highly automated or fully automated manner.

Within the meaning of the application, the automation level of a vehicle is determined according to the definitions of the standard SAE J3016.

According to the standard SAE J3016, the following applies to the automation level:

| SA Level | Name | Description |
|---|---|---|
|  | Driver monitors driving area |  |

-continued

| SA Level | Name | Description |
|---|---|---|
| 0 | No automation | The driver takes over the dynamic driving task. |
| 1 | Assistance system | Steering or acceleration/deceleration is taken over in a driving mode-specific manner by a driver assistance system, using pieces of information about the driving surroundings, with the expectation that the driver takes over all remaining aspects of the dynamic driving tasks. |
| 2 | Semi-automation | Steering and acceleration/deceleration are taken over in a driving mode-specific manner by one or multiple driver assistance system(s), using pieces of information about the driving surroundings, with the expectation that the driver takes over all remaining aspects of the dynamic driving tasks. |
| | System monitors driving area | |
| 3 | Conditional automation | All aspects of the dynamic driving task are carried out in a driving mode-specific manner by an automated driving system, with the expectation that the driver responds to the request to intervene. |
| 4 | High level of automation | All aspects of the dynamic driving task are carried out in a driving mode-specific manner by an automated driving system, without the expectation that the driver responds to the request to intervene. Without human reaction, the vehicle continues to be controlled in an automated manner. |
| 5 | Full automation | All aspects of the dynamic driving task are completely carried out by an automated driving system which, similarly to a human driver, handles all roadway and surroundings conditions. |

In Level 0, the driver takes over the complete lateral and longitudinal guidance of the vehicle, as well as the surroundings observation, and there is no fallback level for dynamic driving tasks.

In Level 1, the lateral and longitudinal guidance of the vehicle is primarily taken over by the driver, and the driver is only supported in subtasks by corresponding driver assistance systems. The surroundings observation continues to take place exclusively by the driver, and a fallback level for the functions of the driver assistance systems is provided by the driver.

In Level 2, the lateral and longitudinal guidance of the vehicle is primarily taken over by the control system, at least for some functions. The fallback level continues to be formed by the driver. The surroundings observation is also carried out by the driver.

The driver assistance systems in Levels 1 and 2 support the driver, for example with steering/controlling and/or decelerating/accelerating, and are implemented, for example, by lane-keeping assistants or adaptive cruise control systems.

In Level 3, the lateral and longitudinal guidance of the vehicle is primarily taken over by the control system, at least for some functions. The fallback level continues to be formed by the driver. The surroundings observation is primarily carried out by the control system.

In Levels 4 and 5, the lateral and longitudinal guidance of the vehicle is exclusively carried out by the control system. The fallback level of the vehicle is also formed by the control system. The surroundings observation is also carried out by the control system. In Levels 4, 5, the driver has no option for actively intervening in the control of the vehicle.

The system components in Levels 3 and 4 may control the vehicle under limited conditions, but are not executed unless all the required conditions are met. Examples of such system components are a Traffic Jam Chauffeur or local driverless taxis.

The system components in Level 5 are configured to autonomously control the vehicle under all conditions.

Assisted driving/controlling according to Level 1 means that a driver of the motor vehicle permanently carries out either the lateral guidance or the longitudinal guidance of the motor vehicle. The respective other driving task (i.e., a controlling of the longitudinal guidance or of the lateral guidance of the motor vehicle) is carried out automatically. This means that either the lateral guidance or the longitudinal guidance is automatically controlled in the case of an assisted driving of the motor vehicle.

Semi-automated driving/controlling according to Level 2 means that, in a specific situation (for example: driving on an expressway, driving within a parking facility, passing an object, driving within a traffic lane established by traffic lane markings) and/or for a certain time period, a longitudinal guidance and a lateral guidance of the motor vehicle are automatically controlled. A driver of the motor vehicle does not personally have to manually control the longitudinal and lateral guidance of the motor vehicle. However, the driver must permanently monitor the automatic control of the longitudinal and lateral guidance to be able to manually intervene when needed. The driver must be prepared at any time to completely take over the motor vehicle guidance.

Conditionally automated driving/controlling according to Level 3 means that, in a specific situation (for example: driving on an expressway, driving within a parking facility, passing an object, driving within a traffic lane established by traffic lane markings), a longitudinal guidance and a lateral guidance of the motor vehicle are automatically controlled for a certain time period. A driver of the motor vehicle does not personally have to manually control the longitudinal and lateral guidance of the motor vehicle. Before the automatic control of the lateral and longitudinal guidance is ended, the driver is automatically prompted to take over the driving task (control of the lateral and longitudinal guidance of the motor vehicle), in particular with a sufficient time reserve. If the driver does not take over the driving task, a return into a minimal-risk state is automatically carried out. Boundaries of the automatic control of the lateral and longitudinal guidance are automatically recognized. In almost all situations, it is possible to automatically return into a minimal-risk system state.

Fully automated driving/controlling according to Levels 4/5 means that, in a specific situation (for example: driving on an expressway, driving within a parking facility, passing an object, driving within a traffic lane established by traffic lane markings), a longitudinal guidance and a lateral guidance of the motor vehicle are automatically controlled. A driver of the motor vehicle does not personally have to manually control the longitudinal and lateral guidance of the motor vehicle. The driver does not have to monitor the automatic control of the longitudinal and lateral guidance to be able to manually intervene when needed.

According to one specific embodiment of the present invention, the emergency control unit is based on a system architecture different from the vehicle control unit and encompasses hardware components and/or software components different from the vehicle control unit.

In this way, a technical advantage may be achieved that systematic errors of the vehicle control unit are not transferred to the emergency control unit. In that the emergency control unit is configured with a system architecture different from the vehicle control unit, including differing hardware and software components, it is possible to prevent systematic errors, which arose during manufacture/development or programming of the main strand of the vehicle control unit, from being transferred to the emergency control unit. Such systematic errors may result in a simultaneous failure of the vehicle control unit and of the emergency control unit and, associated therewith, in a malfunction of the control redundancy of the vehicle. In this way, a safe control of the vehicle may be achieved.

According to one specific embodiment of the present invention, the emergency control unit is designed as an emergency braking assistance system or as a lane-keeping assistance system.

In this way, the technical advantage may be achieved that a reliable driver assistance system may be provided as the emergency control unit, which is configured to safely controlling the vehicle when the vehicle control unit thereof fails. Both the emergency braking assistance system and the lane-keeping assistance system are configured to transfer the vehicle into a safe state, for example by safely reducing the speed, in the event of a failure of the vehicle control unit.

According to one specific embodiment of the present invention, the emergency control unit is configured to carry out a surroundings perception and/or a behavior planning and/or an actuator management.

In this way, a technical advantage may be achieved that a reliable control of the vehicle may be provided by the emergency control unit. As a result of the surroundings perception and/or the behavior planning and/or the actuator management, the emergency control unit is configured to plan a corresponding behavior in the form of a calculated trajectory, based on the perceived surroundings, and to accordingly organize the control of the actuators of the vehicle.

According to one specific embodiment of the present invention, the emergency control unit includes at least one smart sensor, which is configured to carry out an object recognition and/or a determination of a trajectory, the surroundings sensor data being data of the at least one smart sensor.

In this way, the technical advantage may be achieved that a technically reliable and cost-effective design of the emergency control unit may be provided. In that the smart sensor is configured to determine or to calculate a trajectory, the emergency control unit is configured to precisely control the vehicle after the vehicle control unit has failed. The smart sensor may be used in at least two different ways in the process. On the one hand, the smart sensor may monitor, and if necessary adapt, an emergency trajectory calculated prior to the failure of the vehicle control unit. On the other hand, the smart sensor may be used to independently determine a trajectory and to accordingly control the actuators of the vehicle.

According to one specific embodiment of the present invention, carrying out the emergency control includes:

carrying out at least one control action, which is configured to transfer the vehicle into a reliable state, the emergency control action including:
  carrying out a brake application and transferring the vehicle into a safe standing position during an emergency operation time interval; and/or
  keeping a lane traveled by the vehicle and preventing inadvertent changes of the lane during the emergency operation time interval; and/or
  steering the vehicle onto a shoulder and preventing inadvertent changes of a lane traveled by the vehicle during the emergency operation time interval; and/or
  carrying out a driving trajectory or a fallback trajectory, calculated by the vehicle control unit before the malfunction occurred; and/or
  providing a manual control to a driver of the vehicle.

In this way, a technical advantage may be achieved that a reliable control of the vehicle may be provided by the emergency control unit, which includes the control actions necessary for safely controlling the vehicle. According to the present invention, the emergency control unit is, in particular, at least configured to effectuate a safe reduction of a speed of the vehicle. As a result of the provided control functions of the emergency control unit, a safe control of the vehicle may be provided. Moreover, the emergency control unit may be limited to the maximum necessary control actions, thereby enabling a reduction or minimization of the complexity of the emergency control unit. As a result of the provision of the control to the driver, he or she may maneuver the vehicle into a safe standing position. The emergency control unit may take over a transitional control until the provision to the driver.

According to one specific embodiment of the present invention, carrying out the emergency control includes:
  carrying out at least one safety action which contributes to the safety of the vehicle, the safety action including:
    activating at least a vehicle lighting and/or a warning lighting of the vehicle; and/or
    executing an emergency braking assistance system of the vehicle; and/or
    recognizing an unprotected road user; and/or
    activating an adaptive cruise control system; and/or
    keeping the lane; and/or
    recognizing road signs and/or speed information; and/or railroad crossings
    parking the vehicle in a parking space; and/or
    carrying out a blind spot recognition.

In this way, the technical advantage may be achieved that additional safety functions may be provided, which enable an additional safeguarding of the vehicle, in addition to the control functions of the emergency control.

According to one specific embodiment of the present invention, the surroundings sensor data are based on at least one surroundings sensor, which is used for the vehicle control.

In this way, the technical advantage may be achieved that the surroundings sensors which are already used for carrying out the vehicle control may be used for controlling the vehicle via the emergency control unit. In this way, no additional surroundings sensors have to be integrated into the vehicle.

According to one specific embodiment of the present invention, the surroundings sensor data are based on at least one surroundings sensor, which is used exclusively for the emergency control.

In this way, the technical advantage may be achieved that a complete separation between the vehicle control and the emergency control may be provided. In this way, a mutual influencing of the vehicle control unit and of the emergency control unit may be prevented, and a so-called freedom from interference may be achieved.

According to one specific embodiment of the present invention, the surroundings sensor data encompass image data and/or video data and/or LIDAR data and/or radar data.

In this way, the technical advantage may be achieved that a precise control of the vehicle may be provided.

According to a second aspect of the present invention, a processing unit is provided, the processing unit being configured to carry out the method according to the present invention for controlling a vehicle according to one of the preceding specific embodiments.

According to a third aspect of the present invention, a computer program product is provided, encompassing commands which, during the execution of the program by a data processing unit, prompt the data processing unit to carry out the method according to the present invention for controlling a vehicle according to one of the preceding specific embodiments.

Exemplary embodiments of the present invention are described based on the figures.

DETAILED DESCRIPTION OF EXAMPLE EMBODIMENTS

Figure 1:
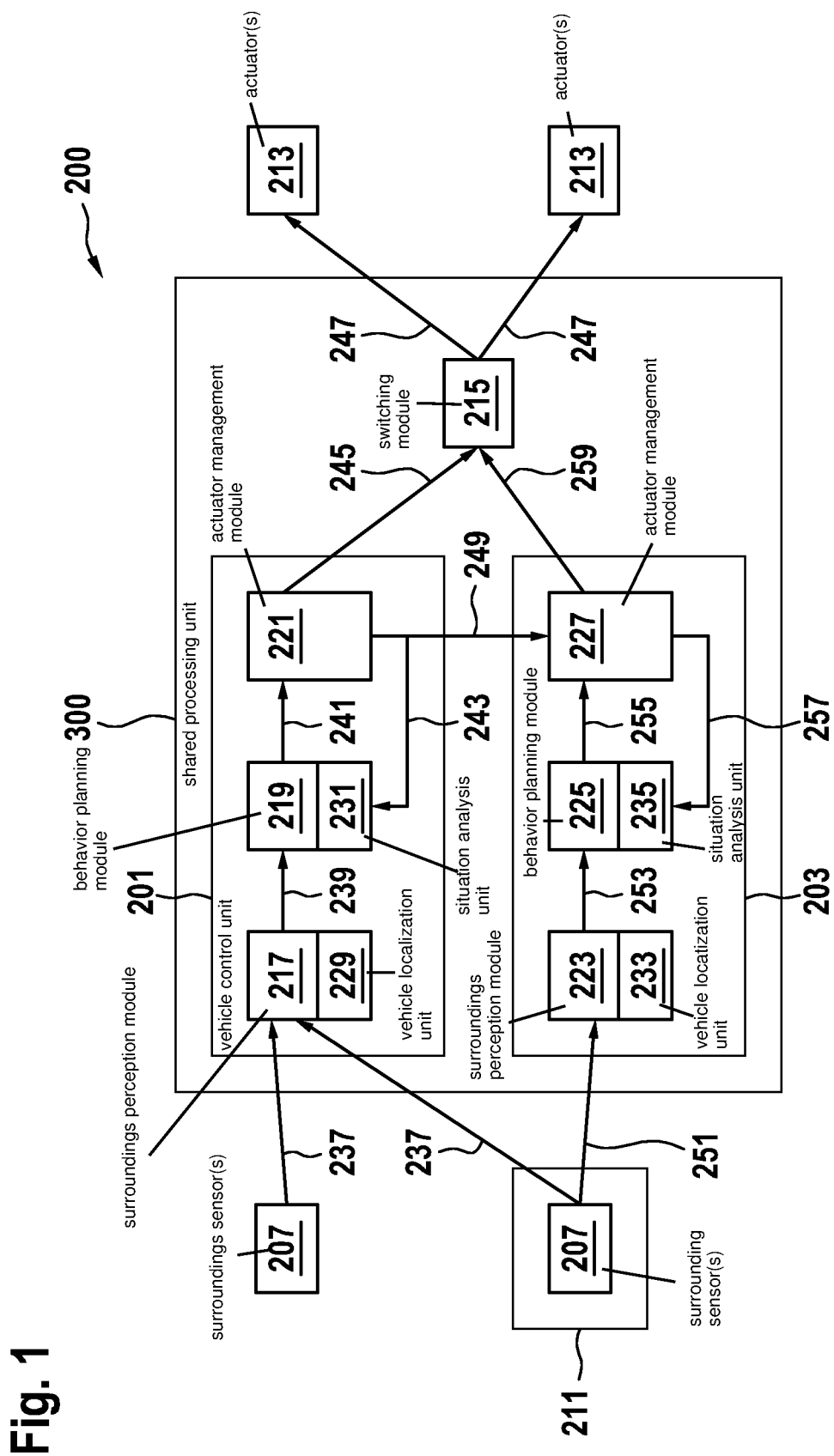
FIG. 1 shows a schematic representation of a system for controlling a vehicle according to one specific embodiment of the present invention.

FIG. 1 shows a schematic representation of a system 200 for controlling a vehicle according to one specific embodiment.

In the shown specific embodiment, system 200 for controlling a vehicle includes a vehicle control unit 201 and an emergency control unit 203. In the shown specific embodiment, vehicle control unit 201 and emergency control unit 203 may be implemented on a shared processing unit 300.

System 200 furthermore includes a multitude of surroundings sensors 207, which are each connected to vehicle control unit 201 with the aid of a data interface 237.

System 200 furthermore includes a switching module 215, which is connected via data interfaces 245, 259 both to vehicle control unit 201 and to emergency control unit 203 and is configured to interconnect vehicle control unit 201 and emergency control unit 203. Switching module 215 is furthermore connected to a multitude of actuators 213 of system 200 via a data interface 247.

For controlling the vehicle via vehicle control unit 201, vehicle control unit 201 receives surroundings sensor data of surroundings sensors 207 via data interfaces 237 and calculates corresponding control data, which are transferred via switching module 215 to actuators 213, which are controlled according to the control data of vehicle control unit 201.

According to the present invention, vehicle control unit 201 is designed as a highly automated or fully automated control unit of the vehicle. For this purpose, vehicle control unit 201 includes a surroundings perception module 217, with the aid of which a surroundings perception of surroundings of the vehicle may be carried out, based on the surroundings sensor data of surroundings sensors 207. Vehicle control unit 201 furthermore includes a behavior planning module 219, which is connected via a data interface 239 to surroundings perception module 217. Behavior planning module 219 is configured, based on the surroundings perception of surroundings perception module 217, to plan a corresponding behavior of the vehicle which may encompass in the form of a driving maneuver calculated by taking the vehicle surroundings into consideration. Vehicle control unit 201 furthermore includes an actuator management module 221, which is connected via a data interface 241 to behavior planning module 219. Based on the data of behavior planning module 219, for example the calculated driving maneuver, actuator management module 221 may generate corresponding control data in the form of driving trajectories, based on which a control of actuators 213 for controlling the vehicle according to the planned behavior or the calculated driving trajectory is made possible.

Surroundings perception module 217 furthermore includes a vehicle localization unit 229 with the aid of which a localization of the vehicle within the surroundings of the vehicle is made possible. Behavior planning module 219 furthermore includes a situation analysis unit 231, with the aid of which an analysis of the driving situation of the vehicle may be carried out and which may be taken into consideration in the behavior planning of the vehicle. Actuator management module 221 furthermore is connected to situation analysis unit 231 with the aid of a data interface 243. In this way, the control data calculated by actuator management module 227 or the respectively calculated driving trajectory may be sent as feedback to situation analysis unit 231 via data interface 243.

In the shown specific embodiment, emergency control unit 203 also includes a surroundings perception module 223, which is configured to create a surroundings perception of the vehicle, based on the surroundings sensor data of surroundings sensors 207. Surroundings perception module 223 also includes a vehicle localization unit 233 with the aid of which a localization of the vehicle in the perceived surroundings is made possible. Emergency control unit 203 furthermore includes a behavior planning module 225, which is connected via a data interface 253 to surroundings perception module 223. Behavior planning module 225 is configured to plan a behavior of the vehicle in the form of corresponding driving maneuvers, based on the data of surroundings perception module 223. For this purpose, behavior planning module 225 includes a situation analysis unit 235 with the aid of which an analysis of the situation in which the vehicle is situated may be carried out. Emergency control unit 203 furthermore includes an actuator management module 227, which is connected via an interface 255 with behavior planning module 225, and which is configured to calculate corresponding driving trajectories based on the planned behavior. Actuator management module 227 is, in turn, connected via a return data interface 257 to situation analysis unit 235, so that the calculated trajectory may be fed into the situation analysis unit as feedback.

In the shown specific embodiment, emergency control unit 203 and, in particular, actuator management module 221 are connected via a data interface 249 to emergency control unit 203 and, in particular, to actuator management module 227. A driving trajectory calculated by vehicle control unit 201 may be transferred to emergency control unit 203 via data interface 249.

In the shown specific embodiment, emergency control unit 203 is connected via data interfaces 251 to a subset 211 of surroundings sensor data 207 of vehicle control unit 201. Emergency control unit 203 thus uses at least some of surroundings sensors 207, which are also used for vehicle control unit 201.

According to the present invention, emergency control unit 203 is designed as a driver assistance system and is maximally configured for a conditionally automatic control according to automation level 3. The emergency control unit is preferably designed as an emergency braking assistance system or as an emergency braking and lane-keeping assistance system or as an emergency braking and lane-keeping assistance system including a lane-change function. The emergency control unit is thus at least configured to carry out an emergency brake application of the vehicle, and to transfer the vehicle into a safe state, in the event of a failure of the vehicle control unit. Emergency control unit 203 may additionally be configured to keep the vehicle on the traveled lane and thus, to transfer the vehicle into a safe state in the event of a failure of vehicle control unit 201.

When the vehicle is controlled via vehicle control unit 201, which, in particular, is configured as a highly automated or fully automated control unit according to automation level 4 or 5, vehicle control unit 201 receives surroundings sensor data of the multitude of surroundings sensors 207. Surroundings sensors 207 may, in particular, be designed as image or video sensors, LIDAR sensors or radar sensors, so that the surroundings sensor data encompass image data and/or video data and/or LIDAR data and/or radar data. Based on the surroundings sensor data, vehicle control unit 201 for controlling the vehicle in a highly automated or fully automated manner calculates corresponding driving trajectories, using the aforementioned modules, which are transferred via switching module 215 to the multitude of actuators 213 of the vehicle.

In the event of a malfunction of vehicle control unit 201, which may exist, for example, due to erroneous control signals or due to a complete absence of control signals of vehicle control unit 201, switching module 215 switches to a control by emergency control unit 203. Based thereon, emergency control unit 203 carries out at least one control action, which is designed to transfer the vehicle into a safe state. Emergency control unit 203 is limited compared to vehicle control unit 201 in terms of the execution of the respective control actions, and is only configured to carry out a limited selection of possible control actions. According to the present invention, emergency control unit 203 is at least configured to carry out an emergency brake application of the vehicle, and to reduce a speed of the vehicle in a safe manner, and to thereby transfer the vehicle into a safe standing position. The speed reduction by emergency control unit 203 may, in particular, be carried out during an emergency operation interval. Emergency control unit 203 may additionally be configured to keep the vehicle on the traveled traffic lane.

The emergency control unit according to the present invention is not designed to represent an exact copy of the vehicle control unit, which is configured to carry out all driving functions of the vehicle control unit. Instead, the present invention is based on the idea of providing or using an emergency control unit which is drastically limited compared to the vehicle control unit in terms of complexity and functionality, and which is primarily configured to be able to carry out control actions which are essential for a safe control of the vehicle. The functionality of emergency control unit 203 is thus primarily limited to transferring the vehicle into a safe state following a failure of the vehicle control unit. The emergency control unit, in contrast, is not able to carry out driving functions which are not exclusively needed for a temporary safe control of the vehicle into a safe state. Emergency control unit 203 thus does not serve to control the vehicle for longer periods, as a replacement for vehicle control unit 201.

In addition to reducing the speed, emergency control unit 203 may be configured to carry out additional driving functions, which contribute to transferring the vehicle into a safe state on short notice. For example, emergency control unit 203 may be configured to prevent an inadvertent change of a traffic lane traveled by the vehicle. As an alternative or in addition, emergency control unit 203 may be configured to steer the vehicle safely onto a shoulder or into a safe roadway area. As an alternative or in addition, emergency control unit 203 may be configured to provide a manual control to a driver of the vehicle. As an alternative or in addition, emergency control unit 203 may be configured to execute a driving trajectory, calculated by vehicle control unit 201 before the malfunction occurred, or a fallback trajectory, which are each transferred via data interface 249 to emergency control unit 203, and to control the vehicle based thereon.

Emergency control unit 203 may furthermore be configured to carry out safety actions, which may contribute to an increased safety of the vehicle. The safety action may, for example, encompass an activation of a vehicle lighting and/or a warning lighting of the vehicle. As an alternative or in addition, unprotected road users may be recognized by emergency control unit 203. As an alternative or in addition, an adaptive cruise control system may be activated by emergency control unit 203. As an alternative or in addition, emergency control unit 203 may carry out a recognition of road signs and/or speed information. Furthermore, the vehicle may be steered into a parking space or a blind spot recognition may be carried out.

For this purpose, emergency control unit 203 is configured to calculate corresponding driving trajectories, based on the surroundings sensor data of surroundings sensors 207, using the described modules, based on which a control of actuators 213 and a control of the vehicle are made possible.

According to the present invention, vehicle control unit 201 is designed for a highly automated and/or fully automated control of the vehicle according to automation levels 4 and 5, while emergency control unit 203 is designed as a driver assistance system, which is maximally configured for a conditional automatic control according to automation level 3.

Figure 2:
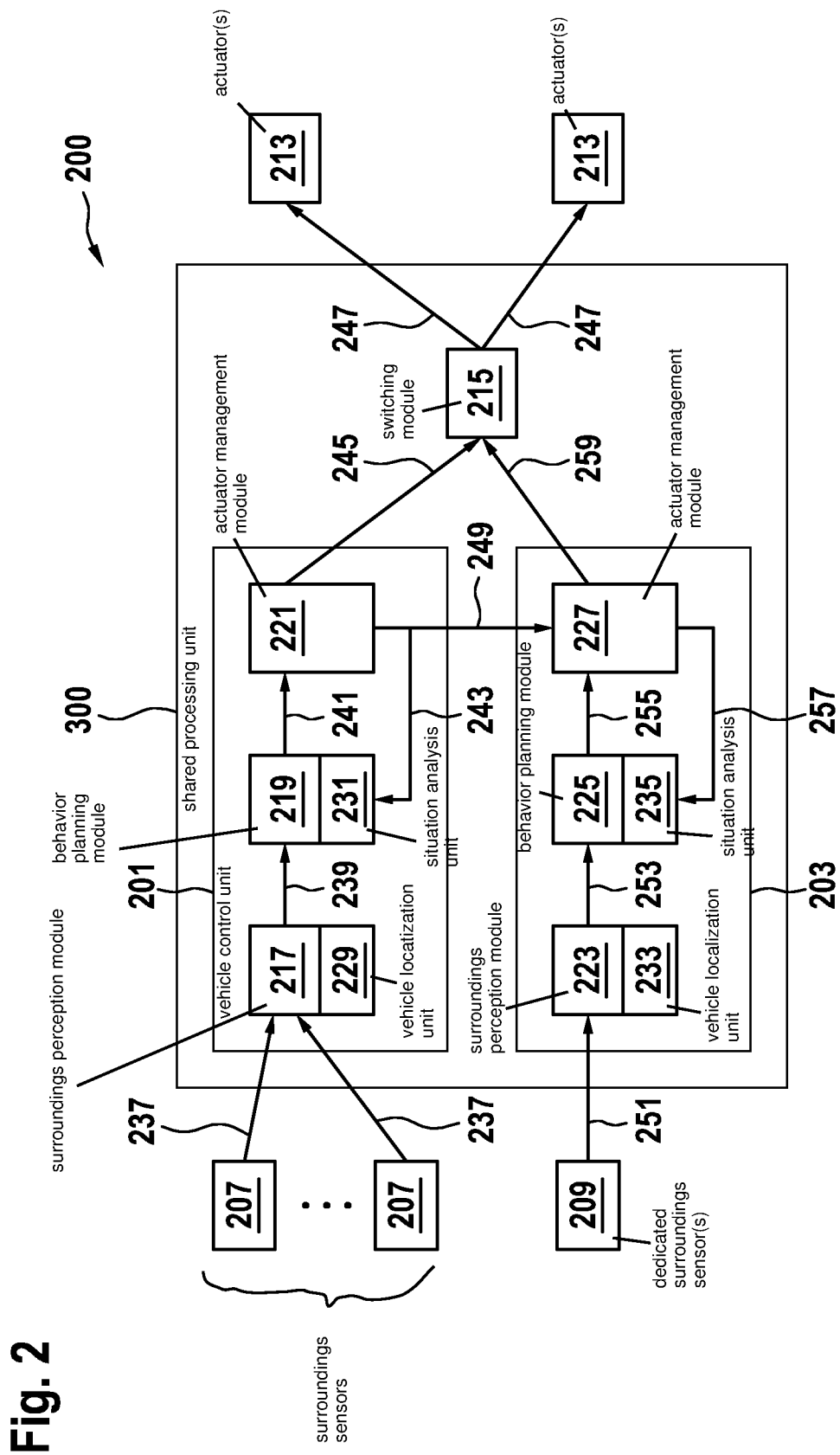
FIG. 2 shows a further schematic representation of the system for controlling a vehicle according to one further specific embodiment of the present invention.

FIG. 2 shows a further schematic representation of system 200 for controlling a vehicle according to one further specific embodiment.

The specific embodiment in FIG. 2 is based on the specific embodiment in FIG. 1. The shown specific embodiment only differs from the specific embodiment in FIG. 1 in that emergency control unit 203 operates on dedicated surroundings sensors 209, which are not used by vehicle control unit 201. The further features of vehicle control unit 201 or of emergency control unit 203 correspond to the specific embodiment of FIG. 1 and are not described again in detail.

Figure 3:
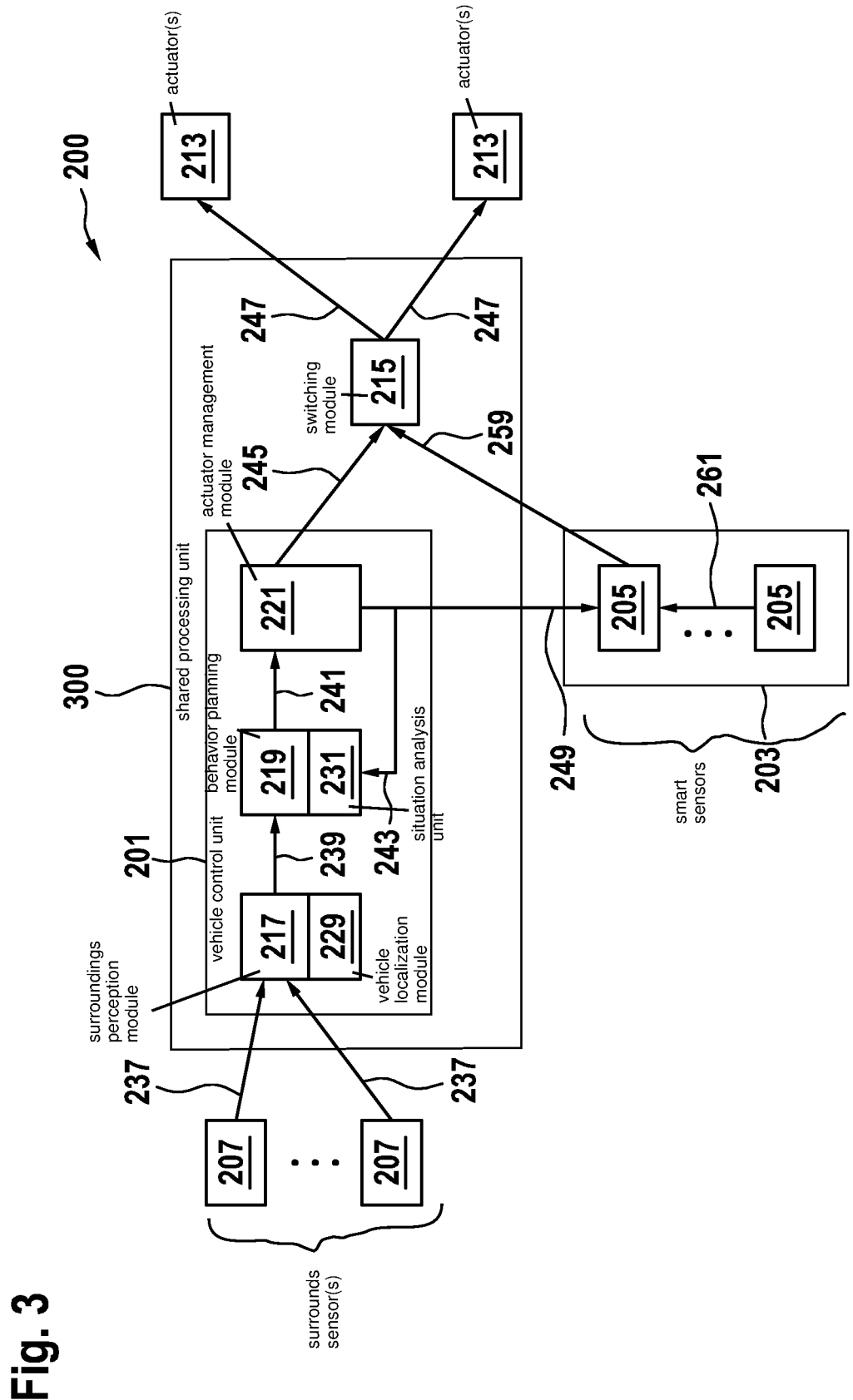
FIG. 3 shows a further schematic representation of the system for controlling a vehicle according to one further specific embodiment of the present invention.

FIG. 3 shows a further schematic representation of system 200 for controlling a vehicle according to one further specific embodiment.

The specific embodiment in FIG. 3 is based on the specific embodiment in FIG. 1. In the shown specific embodiment, the emergency control unit differs in that it includes a multitude of smart sensors 205. Emergency control unit 203 is furthermore not installed on processing unit 203 carrying out vehicle control unit 201 or is carried out by same. In the shown specific embodiment, smart sensors 205 are configured to carry out an object recognition and/or a trajectory determination of a driving trajectory. Smart sensors 205 may, for example, be designed as image or video sensors, LIDAR sensors or radar sensors, and configured to detect surroundings of the vehicle as surroundings sensors of the vehicle.

Upon detection of a malfunction of vehicle control unit 201, switching module 215 switches to a control via emergency control unit 203. According to the specific embodiment described with respect to FIG. 1, emergency control unit 203, in the shown specific embodiment, is also configured to carry out the control actions or safety actions described there. In particular, emergency control unit 203, in the form of smart sensors 205, is at least configured to effectuate a safe reduction of a speed of the vehicle. Emergency control unit 203 is furthermore configured to generate corresponding driving trajectories, based on the surroundings sensor data of the smart sensors, based on which a control of the vehicle is made possible. As an alternative or in addition, vehicle control unit 201, in the form of smart sensors 205, is configured to execute a driving trajectory generated most recently by vehicle control unit 201, or a fallback trajectory.

Figure 4:
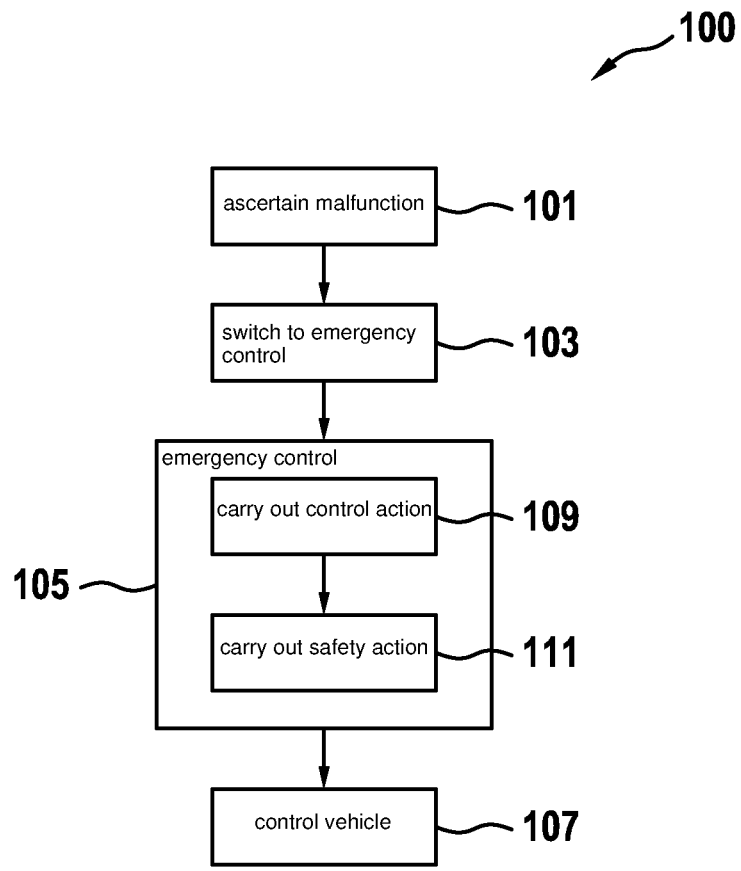
FIG. 4 shows a flowchart of a method for controlling a vehicle according to one exemplary embodiment of the present invention.

FIG. 4 shows a flowchart of a method 100 for controlling a vehicle according to one specific embodiment.

Method 100 according to the present invention for controlling a vehicle which is controllable in a highly automated or fully automated manner may be carried out by a system 200 according to the specific embodiments of FIGS. 1 through 3.

For controlling a vehicle, in a method step 101, initially a malfunction of vehicle control unit 201 of the vehicle is ascertained.

Thereupon, in a method step 103, a switch is carried out from vehicle control unit 201 to emergency control unit 203.

Thereupon, in a method step 105, emergency control unit 203 is carried out.

For this purpose, in a method step 109, at least one control action is carried out by the emergency control unit. In the process, the control action includes at least a safe reduction of a speed of the vehicle and a transfer of the vehicle into a safe standing position.

In a method step 111, furthermore a safety action may be carried out by emergency control unit 203.

In a method step 107, the vehicle is controlled based on the at least one control action carried out by emergency control unit 203.

Figure 5:
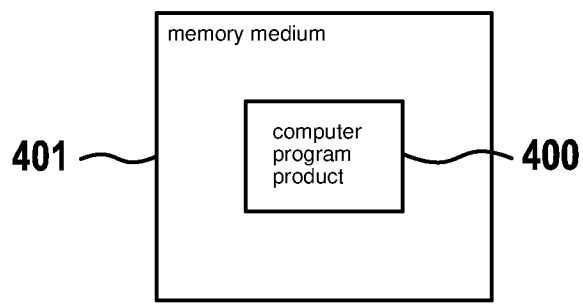
FIG. 5 shows a schematic representation of a computer program product, in accordance with an example embodiment of the present invention.

FIG. 5 shows a schematic representation of a computer program product 400 according to one specific embodiment.

In the shown specific embodiment, computer program product 400 is stored on a memory medium 401. Memory medium 401 may be a commercially available memory medium.

What is claimed is:

1. A method for controlling a vehicle controllable in a highly/fully automated manner, comprising:
ascertaining a malfunction of a primary vehicle control unit of the vehicle that has been carrying out control of the vehicle with a first automated control, the first automated control being classified as an SAE Level 4 or Level 5 automation for a highly automated and/or fully automated control of the vehicle;
in response to the ascertainment of the malfunction, switching from the control by the primary vehicle control unit to execution of a control by an emergency control unit that is capable of controlling the vehicle with a control that is classified maximally as an SAE Level 3 automation and that is incapable of the SAE Level 4 automation and of the SAE Level 3 automation, the emergency control unit being based on a driver assistance system, wherein:
the emergency control unit is formed of different hardware than the primary vehicle control unit; and
the control of the vehicle by the emergency control unit is based on surroundings sensor data of the vehicle.

2. The method as recited in claim 1, wherein software executed by the emergency control unit consists of software components different from software executed by the primary vehicle control unit.

3. The method as recited in claim 1, wherein the emergency control unit is configured as: (i) an emergency braking assistance system or (ii) an emergency braking and lane-keeping assistance system or (iii) an emergency braking and lane-keeping assistance system including a lane-change function.

4. The method as recited in claim 1, wherein the emergency control unit is configured to carry out a surroundings perception and/or a behavior planning and/or an actuator management.

5. The method as recited in claim 1, wherein the emergency control unit includes at least one smart sensor, which is configured to carry out an object recognition and/or a trajectory determination of a driving trajectory, the surroundings sensor data being data of the at least one smart sensor.

6. The method as recited in claim 1, wherein the executing of the control by the emergency control unit includes carrying out at least one control action, which is configured to transfer the vehicle into a safe state, the emergency control action including:
keeping a lane traveled by the vehicle and preventing inadvertent changes of the lane during the emergency operation time interval; and/or
steering the vehicle onto a shoulder; and/or
providing a manual control to a driver of the vehicle, and providing a control function until the control is taken over by the driver.

7. The method as recited in claim 1, wherein the executing of the emergency control includes carrying out at least one safety action which contributes to safety of the vehicle, and the safety action includes:
activating at least one vehicle lighting and/or a warning lighting of the vehicle; and/or
recognizing an unprotected road user; and/or
activating an adaptive cruise control system; and/or
recognizing road signs and/or speed information; and/or
carrying out a blind spot recognition.

8. The method as recited in claim 1, wherein the surroundings sensor data are based on at least one surroundings sensor, which is used for the vehicle control.

9. The method as recited in claim 1, wherein the surroundings sensor data are based on at least one surroundings sensor, which is exclusively used for the emergency control.

10. The method as recited in claim 1, wherein the surroundings sensor data encompass image data and/or video data and/or LIDAR data and/or radar data.

11. The method as recited in claim 1, wherein the emergency control unit monitors a trajectory along which the vehicle control unit was controlling the vehicle, and, upon the switching to the emergency control unit, generates a modified trajectory based on the monitored trajectory for the control of the vehicle by the emergency control unit.

12. A processing unit configured to control a vehicle, the processing unit configured to:
ascertain a malfunction of a primary vehicle control unit of the vehicle that has been carrying out control of the vehicle with a first automated control, the first automated control being classified as an SAE Level 4 or Level 5 automation for a highly automated and/or fully automated control of the vehicle;
in response to the ascertainment of the malfunction, switch from the control by the primary vehicle control unit to execution of a control by an emergency control unit that is capable of controlling the vehicle with a control that is classified maximally as an SAE Level 3 automation and that is incapable of the SAE Level 4 automation and of the SAE Level 3 automation, the emergency control unit being based on a driver assistance system, wherein:
the emergency control unit is formed of different hardware than the primary vehicle control unit; and
the control of the vehicle by the emergency control unit is based on surroundings sensor data of the vehicle.

13. A computer-readable storage medium on which is stored a computer program including commands for controlling a vehicle controllable in a highly/fully automated manner, the commands, when executed by a computer, causing the computer to perform the following steps:
ascertaining a malfunction of a primary vehicle control unit of the vehicle that has been carrying out control of the vehicle with a first automated control, the first automated control being classified as an SAE Level 4 or Level 5 automation for a highly automated and/or fully automated control of the vehicle;
in response to the ascertainment of the malfunction, switching from the control by the primary vehicle control unit to execution of a control by an emergency control unit that is capable of controlling the vehicle with a control that is classified maximally as an SAE Level 3 automation and that is incapable of the SAE Level 4 automation and of the SAE Level 3 automation, the emergency control unit being based on a driver assistance system, wherein:
the emergency control unit is formed of different hardware than the primary vehicle control unit; and
the control of the vehicle by the emergency control unit is based on surroundings sensor data of the vehicle.

\* \* \* \* \*